(12) United States Patent
Elumalai et al.

(10) Patent No.: US 9,111,233 B2
(45) Date of Patent: *Aug. 18, 2015

(54) CONTEXTUALLY-APPROPRIATE TASK REMINDERS

(71) Applicant: MICROSOFT TECHNOLOGY LICENSING, LLC, Redmond, WA (US)

(72) Inventors: Arulkumar Elumalai, Sunnyvale, CA (US); Thomas Bouchard, Seattle, WA (US); Steve Chang, Kirkland, WA (US); Eran Shtiegman, Palo Alto, CA (US); Aaron Tinling, Bainbridge Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,953

(22) Filed: Jun. 30, 2014

(65) Prior Publication Data

US 2014/0317027 A1 Oct. 23, 2014

Related U.S. Application Data

(63) Continuation of application No. 13/071,895, filed on Mar. 25, 2011, now Pat. No. 8,766,793.

(51) Int. Cl.
*G06N 99/00* (2010.01)
*G06Q 10/10* (2012.01)
*G06N 7/00* (2006.01)

(52) U.S. Cl.
CPC ............... *G06N 99/005* (2013.01); *G06N 7/00* (2013.01); *G06Q 10/109* (2013.01)

(58) Field of Classification Search
CPC ................................. G08B 25/10; G06N 7/00
USPC .................. 340/539.11, 539.13, 540, 539.23, 340/815.4; 455/456.3, 414.2, 456.1; 701/453
See application file for complete search history.

(56) References Cited

U.S. PATENT DOCUMENTS

| 6,819,256 | B2 | 11/2004 | Hampton |
| 7,394,405 | B2 | 7/2008 | Godden |
| 7,577,522 | B2 | 8/2009 | Rosenberg |
| 7,649,454 | B2 | 1/2010 | Singh et al. |

(Continued)

OTHER PUBLICATIONS

Mitchell, Christopher; "Use GPS and Web Maps for Location-Aware Apps" 2009, MSDN Magazine, 6 pages.

(Continued)

*Primary Examiner* — Eric M Blount
(74) *Attorney, Agent, or Firm* — Andrew Smith; Danielle Johnston-Holmes; Micky Minhas

(57) ABSTRACT

A computing device learns over time how to identify task reminders that are most likely to be helpful to a user in different contexts. The task reminders can remind the user of activities that the user needs to do. The computing device displays a graphical user interface (GUI) that contains the task reminders identified as being most likely to be helpful to the user in the user's current context. The computing device updates the task reminders in the GUI as the user's context changes. In this way, the computing device can present task reminders that are likely to be currently helpful to the user while suppressing task reminders that are less likely to be helpful to the user at the current time.

20 Claims, 7 Drawing Sheets

(56) References Cited

U.S. PATENT DOCUMENTS

| | | |
|---|---|---|
| 7,848,765 B2 | 12/2010 | Phillips et al. |
| 7,884,713 B1 * | 2/2011 | Emigh ............... 340/539.13 |
| 8,138,912 B2 | 3/2012 | Singh et al. |
| 8,219,115 B1 | 7/2012 | Nelissen |
| 8,385,944 B1 | 2/2013 | Nelissen |
| 8,766,793 B2 | 7/2014 | Elumalai et al. |
| 2003/0224762 A1 * | 12/2003 | Lau et al. ............ 455/412.2 |
| 2004/0230685 A1 * | 11/2004 | Seligmann ............ 709/228 |
| 2006/0058948 A1 * | 3/2006 | Blass et al. ............ 701/207 |
| 2007/0061245 A1 | 3/2007 | Ramer |
| 2007/0188319 A1 * | 8/2007 | Upton ............... 340/539.13 |
| 2008/0032703 A1 | 2/2008 | Krumm et al. |
| 2008/0248815 A1 | 10/2008 | Busch |
| 2009/0037832 A1 | 2/2009 | Falchuk et al. |
| 2009/0224867 A1 * | 9/2009 | O'Shaughnessy et al. .... 340/5.1 |
| 2009/0231128 A1 * | 9/2009 | Watson et al. ............ 340/540 |
| 2009/0239552 A1 | 9/2009 | Churchill et al. |
| 2009/0307268 A1 | 12/2009 | Chappell |
| 2010/0235732 A1 * | 9/2010 | Bergman ............... 715/702 |
| 2010/0291950 A1 | 11/2010 | Lin |
| 2010/0295676 A1 | 11/2010 | Khachaturov |
| 2011/0209159 A1 | 8/2011 | Baratz et al. |
| 2012/0058782 A1 * | 3/2012 | Li ............... 455/456.2 |

OTHER PUBLICATIONS

Sohn et al.; "Place-Its: Location-Based Reminders on Mobile Phones" 2005, 18 pages.

* cited by examiner

CONTEXTUALLY-APPROPRIATE TASK REMINDERS

CROSS REFERENCE TO RELATED APPLICATIONS

This application is a continuation of U.S. patent application Ser. No. 13/071,895, filed Mar. 25, 2011, and entitled CONTEXTUALLY-APPROPRIATE TASK REMINDERS, now U.S. Pat. No. 8,766,793, issued on Jul. 1, 2014, of which the disclosure is incorporated by reference herein in its entirety.

BACKGROUND

In everyday life, there are many tasks that people need to perform. At times, people have so many tasks to perform that they cannot easily remember to perform all of them. To remind themselves of their tasks, people create systems of reminders. For example, people can create paper or electronic task lists, post sticky notes around their offices and homes, make notes on paper or electronic calendars or planners, set reminder flags on emails, or make other types of reminders.

Even with such reminder systems, people still find it difficult to remember all of the tasks that they need to perform. Consequently, people need reminders of the tasks that they need to perform. Many electronic calendaring and task management systems provide such reminders. For example, an electronic calendaring system can display a popup window on a person's computer fifteen minutes before the person is to attend a meeting.

However, there are many situations where people do not benefit from such electronic task reminders. Indiscriminate use of task reminders can annoy people or lead people to ignore the task reminders. For example, it may be pointless to remind a person of a task that the person cannot perform. For instance, it may be pointless or annoying to remind a person to pick up milk when the person is in a business meeting or phone call. In another instance, it may be pointless to remind a person to call a co-worker when the co-worker is unavailable to take phone calls. In another example, it may be pointless to remind a person of tasks that can be performed at a significantly later time. For instance, it may be pointless to remind a person to pick up the person's dry cleaning next week.

SUMMARY

A computing device learns over time how to identify which task reminders are most appropriate to present to a user in different contexts. The computing device displays a graphical user interface (GUI) that contains the task reminders identified as most appropriate to present to the user in a current context. Unless instructed to do so by the user, the computing device does not present the task reminders identified as less appropriate in the current context. By only presenting the most appropriate task reminders for the current context, the computing device can attempt to minimize the risk that the user will be distracted or annoyed by reminders that are unlikely to be helpful to the user. At the same time, by presenting the most appropriate reminders for the current context, the computing device can help the user make more productive use of the user's time.

DETAILED DESCRIPTION

Figure 1:
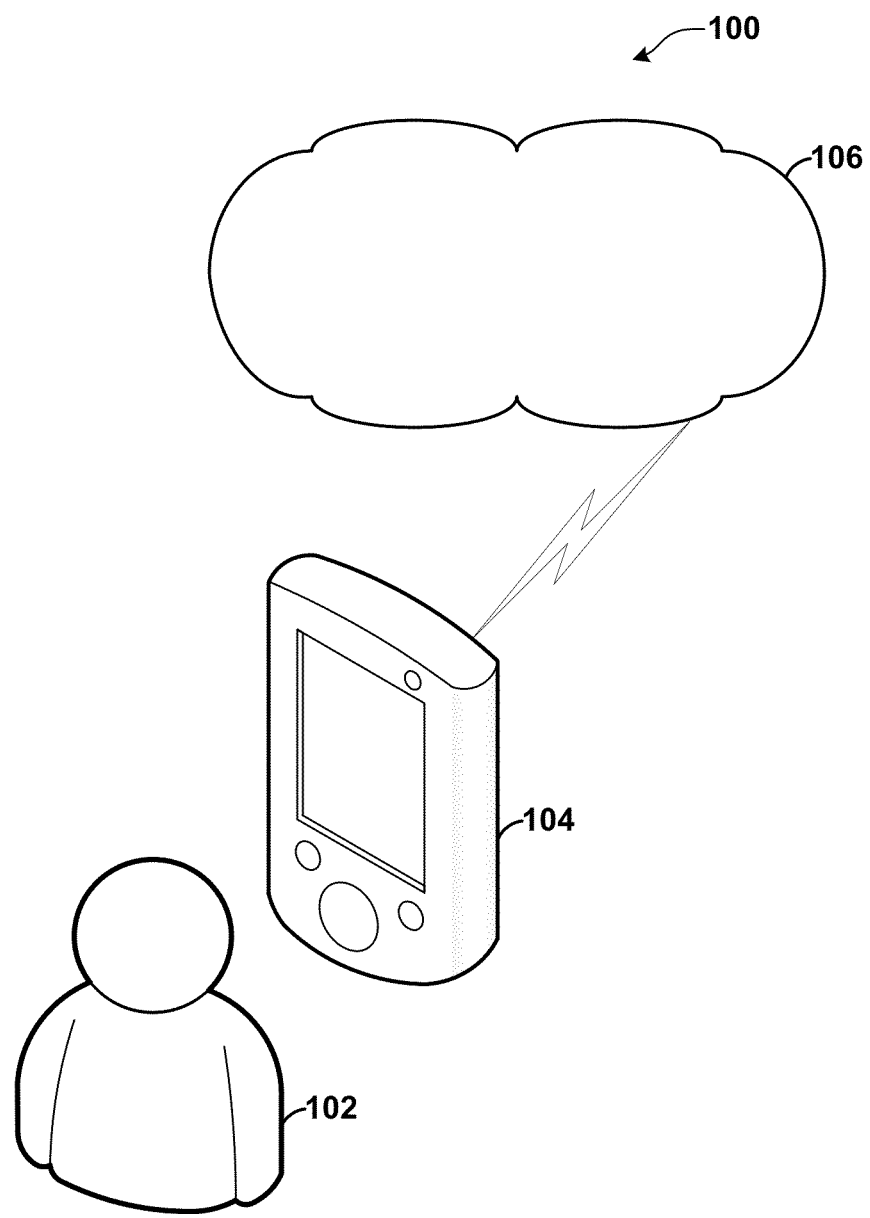
FIG. 1 is a diagram of a system in which a user uses a computing device.

FIG. 1 is a block diagram of an example system 100 in which a user 102 uses a computing device 104. The user 102 is an individual person. For instance, the user 102 can be an employee of a company or a member of the general public. As part of daily life of the user 102, the user 102 performs various tasks. For example, the user 102 may need to prepare a sales presentation for work. In another example, the user 102 may need to pick up milk at the grocery store. In yet another example, the user 102 may need to talk to another person about some activity.

The computing device 104 can be a variety of different types of computing devices. For example, the computing device 104 can be a smart phone, a tablet computer, a laptop computer, a netbook computer, a desktop computer, a computer workstation, an in-car computer, an appliance, or another type of computing device.

The computing device 104 can communicate with other computing devices (not shown) via a communication network 106. For example, the computing device 104 can communicate over the network 106 with a server, a telephone device, a personal computing device, a tablet computer, a networked appliance or sensor, or another type of computing device. In various embodiments, the network 106 can comprise various types of communication network. For example, the network 106 can be a telephone network, the Internet, a local area network, or another type of communication network. The network 106 can include wired and/or wireless communication links.

As the current context of the user 102 changes, the computing device 104 provides task reminders to the user 102 that are contextually-appropriate in the current context of the user 102. In other words, the computing device 104 determines, based on a current context of the user 102, that the user 102 would likely find it helpful to be reminded to perform one or more tasks. The context of the user 102 comprises a state of the user's world at a given point in time. The context of the user 102 can involve aspects of the user's environment, situation, or circumstances. In this instance, the computing device 104 provides to the user 102 reminders to perform these tasks. For example, one of the tasks of the user 102 may be to buy milk. In this example, the computing device 104 can determine, based on the fact that the user 102 is driving near a grocery store, that the user 102 would likely find it helpful to be reminded that the user 102 is to buy milk at the grocery store. In another example, one of the tasks of the user 102 may be to call a colleague. In this example, the computing device 104 can determine, based on the fact that the colleague's online status changed from busy to available, that now would be a good time for the user 102 to call the colleague. In this way, the computing device 104 can remind the user 102 to perform certain tasks when it becomes appropriate for the user 102 to actually perform such tasks.

The computing device 104 can learn over time which task reminders would likely be helpful to the user 102 in different situations. Because of the large number of situations that the user 102 can be in, it may be impractical in some embodiments to use fixed program rules for determining which task reminders would likely be helpful to the user 102 in different situations. In such embodiments, the computing device 104 can use feedback from the user 102 and/or other sources. The computing device 104 modifies how the computing device 104 identifies the contextually-appropriate task reminders in response to the feedback. In this way, the computing device 104 can use the feedback to learn which task reminders would likely be most helpful in various contexts. Consequently, the computing device 104 can learn over time to present different, more appropriate task reminders in similar situations.

Figure 2:
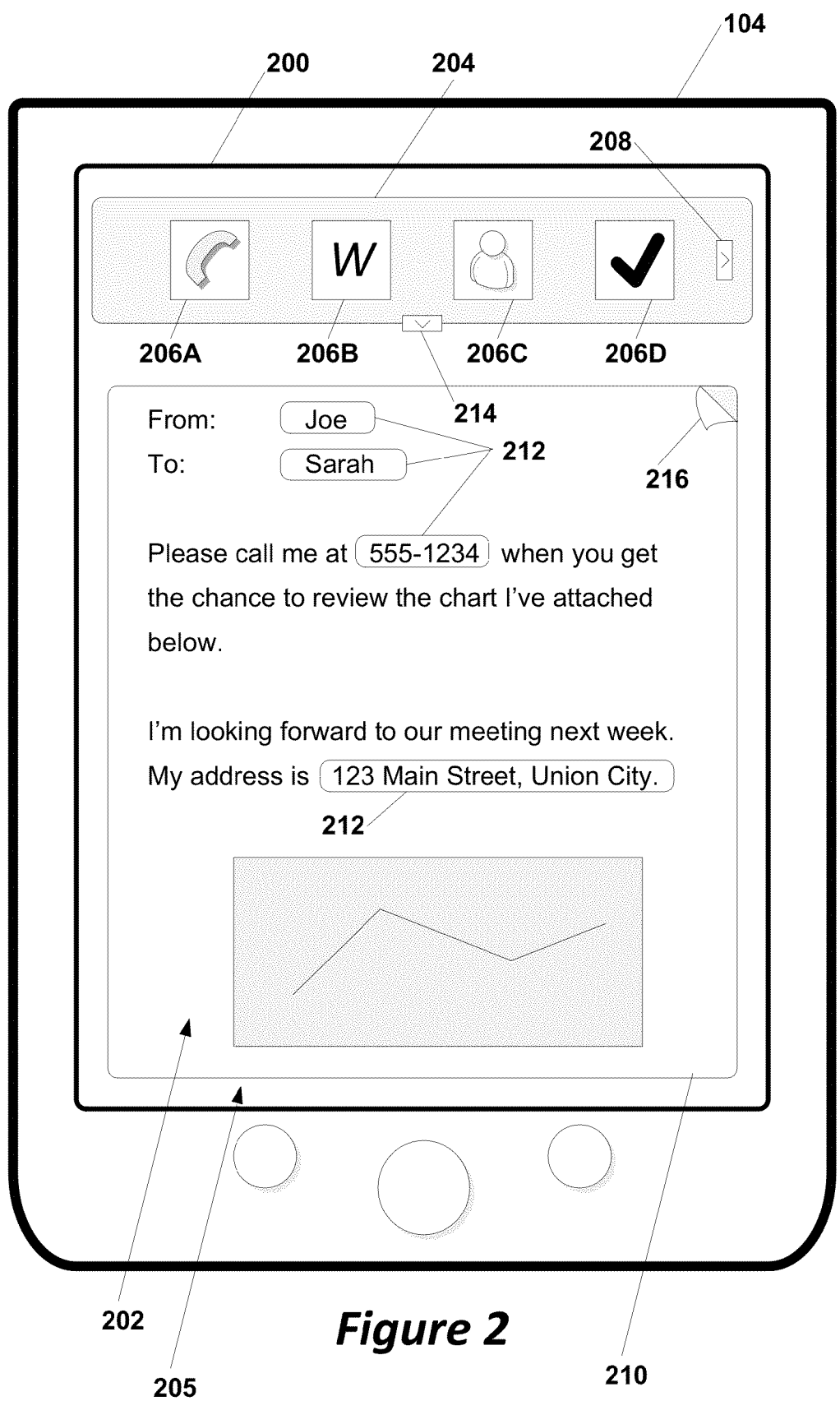
FIG. 2 illustrates example details of the computing device.

FIG. 2 illustrates example details of the computing device 104. As illustrated in the example of FIG. 2, the computing device 104 has a display unit 200. The display unit 200 displays a graphical user interface (GUI) 202. The GUI 202 includes a reminder area 204 and an activity area 205. The reminder area 204 is an area within the GUI 202 for presenting task reminders. The activity area 205 occupies most of the GUI 202 and contains data and features used by the user 102 to perform most activities. In the example of FIG. 2, the reminder area 204 is a horizontal bar adjacent to a top edge of the activity area 205. In some instances, the reminder area 204 can be a vertical bar adjacent to a side edge of the activity area 205. Furthermore, in some instances, the reminder area 204 can switch from being a horizontal bar to being a vertical bar and vice versa in response to changes to the orientation of the computing device 104 or other input.

As illustrated in the example of FIG. 2, the reminder area 204 includes task reminders 206A-206D (collectively, "task reminders 206"). Each of the task reminders 206 is a reminder to the user 102 to perform a particular task. For example, the task reminder 206A can remind the user 102 to call a particular person. In this example, the task reminder 206B can remind the user 102 to work on a particular word processor document. Furthermore, in this example, the task reminder 206C can remind the user 102 to meet with a particular person. In this example, the task reminder 206D can remind the user 102 to pick up dry cleaning.

In the example of FIG. 2, the task reminders 206 comprise graphical icons associated with the corresponding tasks. For example, the task reminder 206A includes an icon shaped like a telephone to indicate that the corresponding task is to make a phone call another person. In other embodiments, the task reminders 206 can include additional information about the corresponding tasks. For example, the task reminders 206 can include brief text messages describing the corresponding tasks. In another example, if one of the task reminders 206 corresponds to a task involving communication with another person, the task reminder can include text or images indicating the other person's online availability status. Furthermore, in some embodiments, the task reminders 206 can include animated graphics. For instance, if one of the task reminders 206 corresponds to a telephone call that the user 102 to presently making, the task reminder can include an animated graphic indicating an amplitude of sound in the telephone call.

As the current context of the user 102 changes, the computing device 104 updates the reminder area 204 such that the reminder area 204 contains task reminders that are contextually-appropriate in the current context of the user 102. For instance, the computing device 104 can order the task reminders 206 within the reminder area 204 based on the likelihoods that the user 102 would find it helpful to be reminded of the corresponding tasks. For example, the computing device 104 has determined that it is most likely that the user 102 would find it helpful to be reminded of the task corresponding to the reminder 206A. The computing device 104 has determined that it is next most likely that the user 102 would find it helpful to be reminded of the task corresponding to the reminder 206B, and so on.

The user 102 can select the reminders 206 to instruct the computing device 104 to perform an action regarding the corresponding tasks. For example, the user 102 can select the reminders 206 to instruct the computing device 104 to display additional information about the corresponding tasks. In another example, the user 102 can select one of the reminders 206 corresponding to a phone call task to instruct the computing device 104 to make a phone call to a particular person. In yet another example, the user 102 can select one of the reminders 206 corresponding to a document to instruct the computing device 104 to open the document.

In various embodiments, the user 102 can select the reminders 206 by providing various types of selection input to the computing device 104. For example, in embodiments where the display unit 200 is a touch screen, the user 102 can select the reminders 206 by tapping on the reminders 206 with a finger or a stylus. In another example, the user 102 can select the reminders 206 by clicking on the reminders 206 with a mouse or pointing device controlled cursor. In some embodiments, the activity area 105 displays more information about one of the task reminders 206 when the user 102 selects the task reminder. In some such embodiments, the user 102 can view more information about another one of the task reminders 206 by making a left or right flicking gesture on the activity area 205 or by selecting one or more controls in the activity area 105.

Furthermore, the reminder area 204 includes a scroll control 208. In the example of FIG. 2, there is only sufficient room in the reminder area 204 for four task reminders. However, the user 102 may need to perform more than four tasks. The user 102 can use the scroll control 208 to instruct the computing device 104 to scroll the reminder area 204 to display task reminders for additional tasks that the user 102 needs to perform. The computing device 104 has determined that these other task reminders are less likely to be useful to the user 102 in the current context than the reminders 206. In other embodiments, the user 102 can instruct the computing device 104 to display additional task reminders in other ways. For example, the display unit 200 can be a touch screen. In this example, the user 102 can instruct the computing device 104 to display additional task reminders by making a flicking or dragging gesture across the reminder area 204.

In addition to the reminder area 204, the GUI 202 can include other features. In the example of FIG. 2, the activity area 205 of the GUI 202 includes an email 210. The email 210 includes a set of task source elements 212 and a control 216. As described below, the user 102 can use the task source elements 212 to create task reminders. The user 102 can use the control 216 to flag the email 210.

Figure 3:
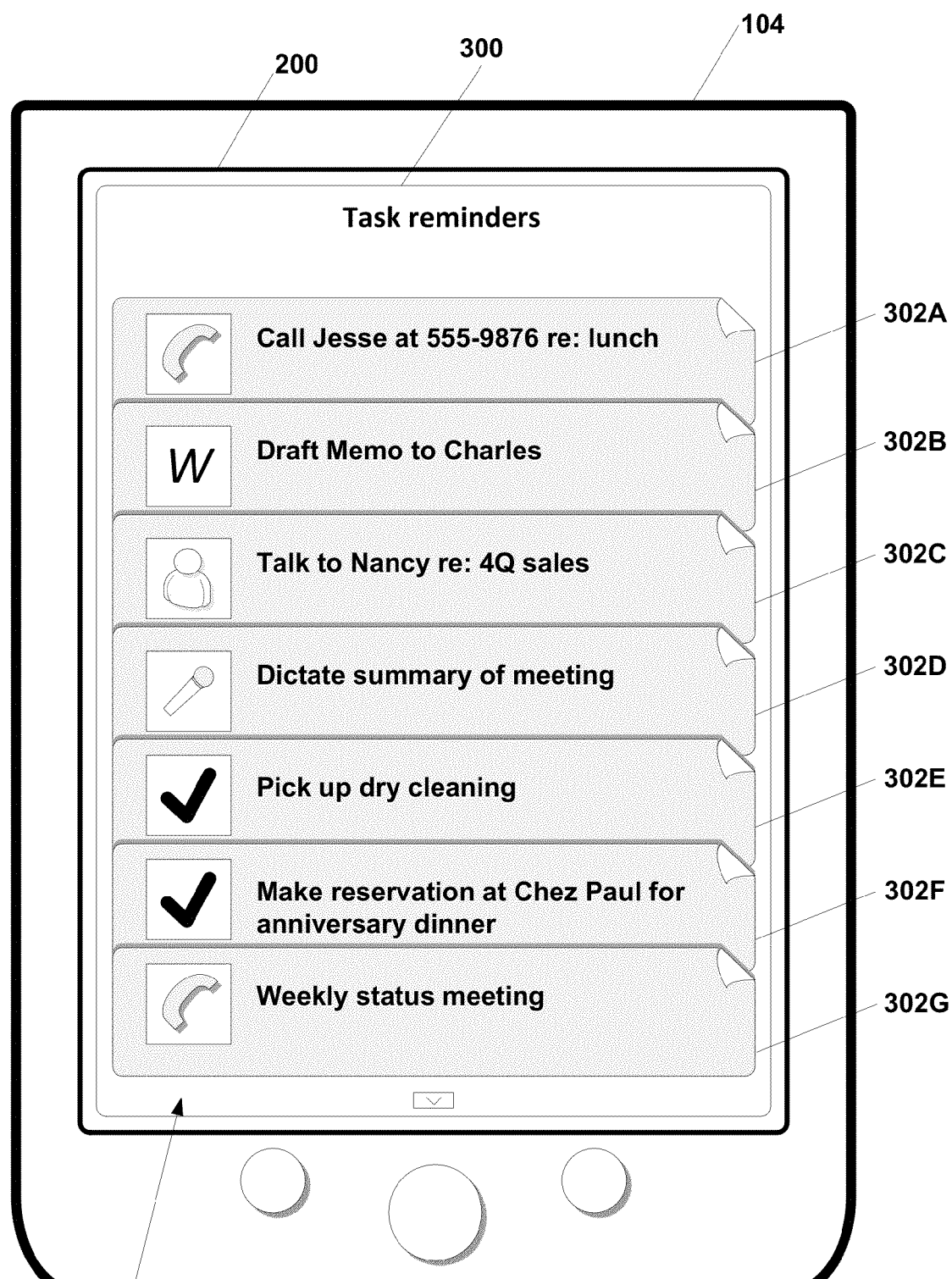
FIG. 3 illustrates an example expanded reminder area in a user interface.

FIG. 3 illustrates an example expanded reminder area 300 in the GUI 202. At times, the reminder area 204 (FIG. 2) may not show enough information to enable to the user 102 to be reminded what tasks to perform. In other words, the user 102 may want to see additional information about the tasks that the user 102 needs to perform. Accordingly, the user 102 can instruct the computing device 104 to display the expanded reminder area 300 instead of the reminder area 204.

The expanded reminder area 300 contains expanded reminders 302A-G (collectively, "expanded reminders 302"). The expanded reminders 302 include additional information about the tasks that the user 102 needs to perform. The computing device 104 can order the expanded reminders 302 within the expanded reminder area 300 based on how helpful the computing device 104 expects the expanded reminders 302 to be given the current situation.

At least some of the expanded reminders 302 correspond to the reminders 206 in the reminder area 204. For example, the expanded reminder 302A corresponds to the reminder 206A. In this example, the expanded reminder 302A includes the icon of the reminder 206A and also includes the text "Call Jesse at 555-9876 re: lunch". In this way, the expanded reminder 302A includes additional information about the task corresponding to the expanded reminder 302A and the reminder 206A.

Similar to the reminders 206, the user 102 can select the expanded reminders 302 to instruct the computing device 104 to perform actions regarding the corresponding tasks. Furthermore, in the example of FIG. 3, the expanded reminder area 300 only includes sufficient space for seven expanded reminders 302. When the user 102 has more than seven tasks to perform, the user 102 can, as with the reminder area 204, scroll the expanded reminder area 300 to reveal additional expanded reminders corresponding to additional tasks.

In various embodiments, the user 102 can instruct the computing device 104 to display the expanded reminder area 300 instead of the reminder area 204 in various ways. For example, the user 102 can select a control 214 (FIG. 2) in the reminder area 204 and drag the control 214 downward to instruct the computing device 104 to display the expanded reminder area 300. In this example, the user 102 can drag the control 214 upward to instruct the computing device 104 to display the reminder area 204 instead of the expanded reminder area 300. In another example, the user 102 can select an onscreen toggle control to switch between the reminder area 204 and the expanded reminder area 300.

Figure 4:
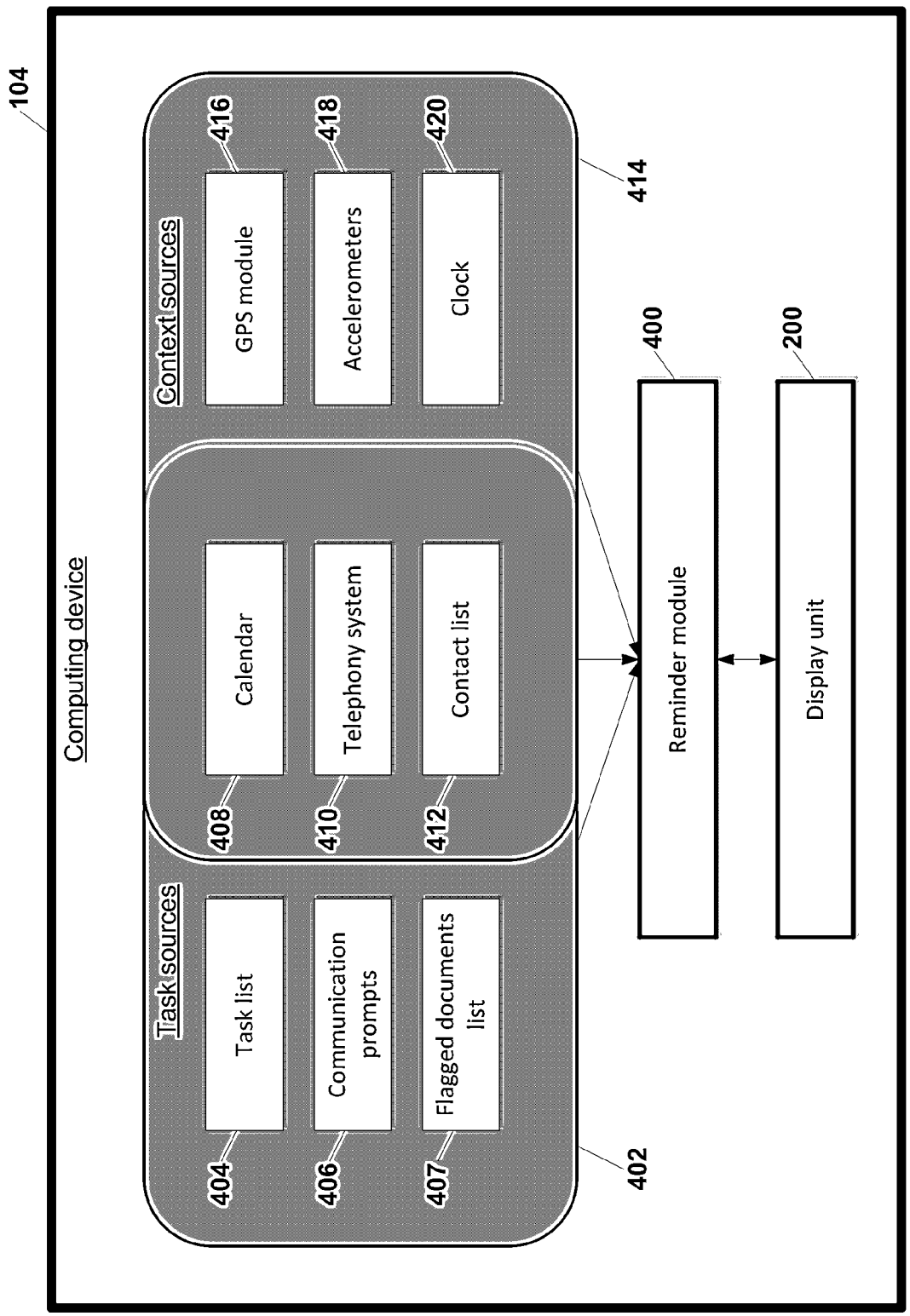
FIG. 4 is a block diagram illustrating example components of the computing device.

FIG. 4 is a block diagram illustrating example components of the computing device 104. As illustrated in the example of FIG. 4, the computing device 104 includes the display unit 200. As discussed above, the computing device 104 can display the GUI 202 on the display unit 200. In other embodiments, the display unit 200 is separate from the computing device 104. For example, the display unit 200 can be a separate monitor device. In yet another example, the display unit 200 can be attached to or be part of another computing device. In this example, the computing device 104 generates information that the other computing device uses to display the GUI 202.

Furthermore, the computing device 104 provides a reminder module 400. The reminder module 400 generates task reminders, determines which of the task reminders are contextually-appropriate, and updates the GUI 202 accordingly. The computing device 104 can comprise one or more computer storage media that store instructions. One or more processing units in the computing device 104 can access and execute these instructions. Execution of these instructions by the one or more processing units configures the computing device 104 such that the computing device 104 provides the functionality of the reminder module 400. In other words, execution of these instructions causes the computing device 104 to provide the reminder module 400.

In addition to the reminder module 400, the computing device 104 includes a set of task sources 402. The task sources 402 are data sources that provide data that the reminder module 400 uses to generate task reminders. In various embodiments, the computing device 104 includes various task sources. In the example of FIG. 4, the task sources 402 in the computing device 104 include a task list 404, a set of communication prompts 406, a flagged documents list 407, a calendar 408, a telephony system 410, and a contact list 412. Readers will appreciate that the computing device 104 can include more, fewer, or different task sources 402 than those illustrated in the example of FIG. 4.

The task list 404 is an explicit list of tasks entered by the user 102 or another person, such as a secretary of the user 102. For example, the task list 404 can include task entries having a description field and a due date field. In this example, the description field of a task entry can include text, such as "Finish cash flow report," and the due date field can include a date, such as "Mar. 21, 2011." Various embodiments enable the user 102 to create entries in the task list 404 in various ways. For example, some embodiments enable the user 102 to type or dictate entries into the task list 404.

The communication prompts 406 are items created by the user 102 to remind the user 102 to communicate with one or more other people. For example, the user 102 can create one of the communication prompts 406 to remind the user 102 to call as person named "Jesse" at a particular phone number. In some embodiments, the computing device 104 stores the communication prompts 406 as entries in the task list 404. In other embodiments, the communication prompts 406 are stored separate from the task list 404.

Various embodiments enable the user 102 to create the communication prompts 406 in various ways. For example, the computing device 104 can detect task source elements in emails or other documents. The task source elements are elements that can serve as the bases for task reminders. In this example, the computing device 104 highlights the detected task source elements or otherwise visually differentiates the detected task source elements from elements that are not configured to serve as bases for task reminders. Furthermore, in this example, the user 102 can create the communication prompts 406 by dragging various ones of the task source elements 212 (FIG. 2) to the reminder area 204. For example, one of the task source elements 212 in the email 210 contains a telephone number. The user 102 can create a communication prompt to remind the user 102 to make a phone call to the person "Joe," by dragging this task source element to the reminder area 204.

After dragging this task source element to the reminder area 204, the computing device 104 can display data entry controls in the GUI 202 that enable the user 102 to provide more information about the corresponding task. For example, the computing device 104 can display data entry controls that enable the user 102 to specify a deadline for communicating with another person, a reason for communicating with the other person, and other information about the task of communicating with the other person. Example data entry controls include textboxes, text areas, check boxes, drop boxes, radio buttons, and other onscreen elements that facilitate user entry of data.

The flagged documents list 407 includes a list of flagged documents. In some circumstances, the user 102 may be working on a document but then need to perform some other activity. For example, the user 102 may be using the computing device 104 to compose or review a word processor document or email, but then may need to go to a meeting. In such circumstances, the user 102 can flag the document in order to remember to resume working on the document. The flagged documents list 407 includes references to such documents flagged by the user 102. When the user 102 flags a document, the computing device 104 can display data entry controls that enable the user 102 to provide input to the computing device 104 containing additional information about how and when the user 102 wants to resume working on the document.

In various embodiments, the user 102 can flag a document in various ways. For example, when the computing device 104 displays the document in the activity area 205 of the GUI 202, the computing device 104 displays a flag control in the document. The user 102 can use the flag control to flag the document. As illustrated in the example of FIG. 2, the email 210 includes a flag control 216. In the example of FIG. 2, the flag control 216 is shaped to evoke the concept of dog-earing a page in a book by bending over a corner of the page. One state of the flag control 216 can indicate that the email 210 is flagged, another state of the flag control 216 can indicate that the email 210 is not flagged. In the example of FIG. 2, the flag control 216 is in a bent or dog-eared state to indicate that the email 210 is flagged.

The calendar 408 stores event entries. The event entries include data regarding events that are to occur on specified calendar days. For example, the calendar 408 can include an event entry containing data regarding a meeting. In this example, the event entry can specify that the meeting is to occur on Aug. 12, 2011, starting at 3:00 p.m. and ending at 4:00 p.m. In addition, the event entry can specify a location of the meeting, a description of the meeting, anticipated attendees of the meeting, and other information regarding the meeting.

The telephony system 410 handles telephony sessions for the computing device 104. For example, the user 102 can use functionality provided by the telephony system 410 to make and receive phone or video calls. When the user 102 is using the computing device 104 to make or receive a call, the reminder module 400 can use data from the telephony system 410 to create a task reminder that reminds the user 102 that the call is occurring. Reminding the user 102 that the call is occurring can be helpful to the user 102 when the user 102 is concurrently using the computing device 104 to perform actions in addition to the call.

The contact list 412 comprises sets of contact information about other people. For example, the contact list 412 can include a set of contact information about a person "Joe" and another set of contact information about a person "Lucy." The set of contact information about a person can include the person's work phone number, mobile phone number, email address, home or business postal address, and other information about the person.

Furthermore, the computing device 104 includes a set of context sources 414. The context sources 414 are data sources that provide context data to the reminder module 400. The context data are indicative or representative of the context of the user 102. The reminder module 400 can use the context data provided by the context sources 414 to determine the current context or situation of the user 102. For instance, the reminder module 400 can use the context data to generate data representative of likelihoods that the user 102 would find given task reminders helpful.

In various embodiments, the computing device 104 includes various context sources 414. In the example of FIG. 4, the context sources 414 in the computing device 104 include a global positioning system (GPS) module 416, one or more accelerometers 418, a clock 420, the calendar 408, the telephony system 410, and the contact list 412. Readers will appreciate that the computing device 104 can include more, fewer, or different context sources 414 than those illustrated in the example of FIG. 4. Furthermore, readers will note that some of the context sources 414 (i.e., the calendar 408, the telephony system 410, and the contact list 412) are also among the task sources 402.

The GPS module 416 generates data indicating a geographical location of the computing device 104. The accelerometers 418 generate data indicating the acceleration of the computing device 104. The clock 420 generates data indicating a current time.

In various embodiments, the task sources 402 and the context sources 414 are implemented in various ways. For example, the computing device 104 can include special hardware units implementing one or more of the task sources 402 and the context sources 414. Furthermore, one or more processing units in the computing device 104 can execute instructions that cause the computing device 104 to provide one or more of the task sources 402 and one or more of the context sources 414.

Figure 5:
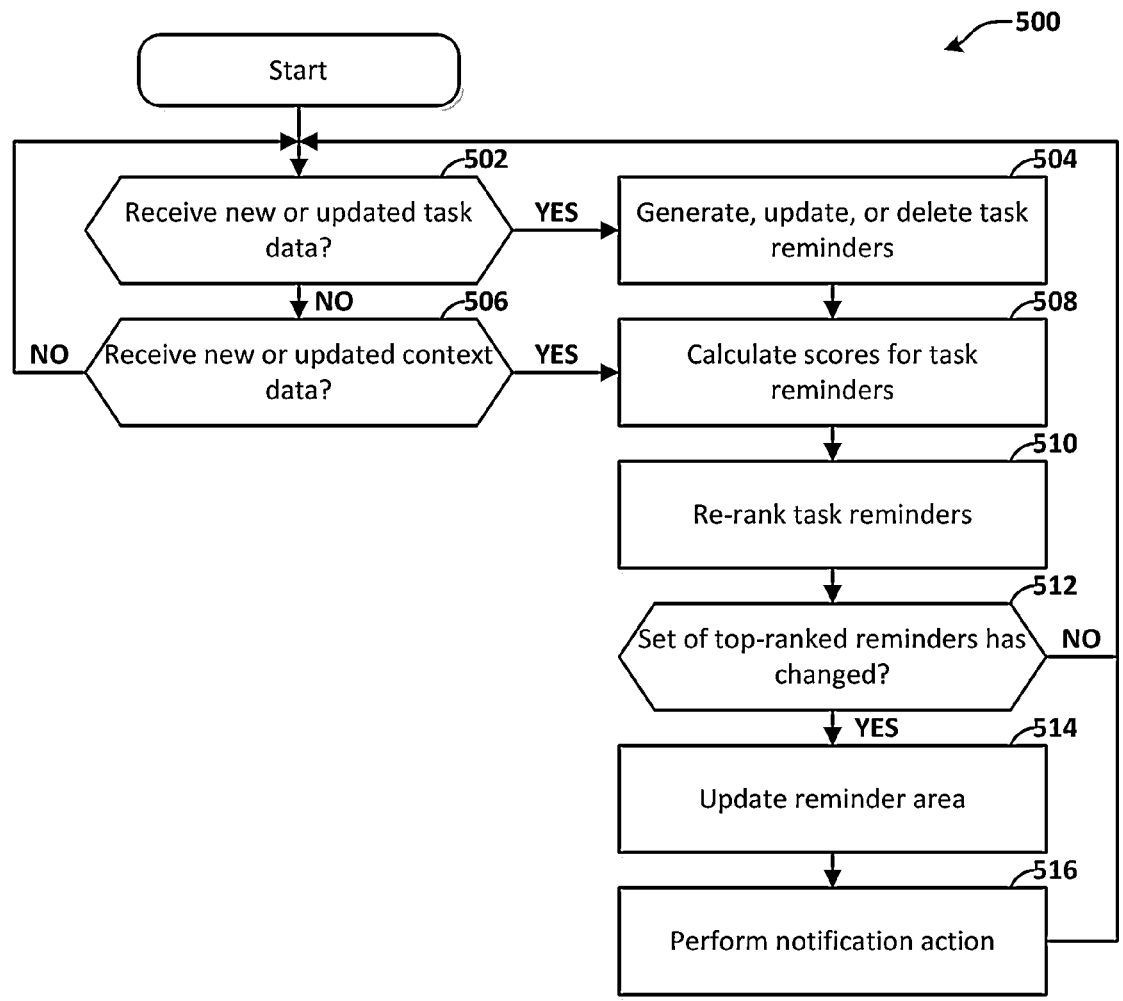
FIG. 5 is a flowchart illustrating an example operation of a reminder module.

FIG. 5 is a flowchart illustrating an example operation 500 of the reminder module 400. As illustrated in the example of FIG. 5, the reminder module 400 determines whether the reminder module 400 has received new or updated task data (502). As discussed briefly above, the reminder module 400 receives the task data from the task sources 402. From time to time, the task data provided by the task sources 402 changes in a relevant way. For example, the user 102 can add a new task entry to the task list 404 or update a given task entry in the task list 404. In this example, the reminder module 400 can receive data representing the new task entry or the updated task entry. In another example, the user 102 can add a new communication prompt to the set of communication prompts 406. In this example, the reminder module 400 receives data regarding the new communication prompt.

Furthermore, in some embodiments, the reminder module 400 can receive task data from data sources that are outside the computing device 104. As explained above, the computing device 104 is able to communicate with one or more other computing devices through the network 106. These other computing devices on the network 106 can provide task data to the reminder module 400. For example, one of the computing devices on the network 106 can host an online calendaring service. In this example, the reminder module 400 can receive event entries from the online calendaring service. In another example, the computing device 104 can communicate over the network 106 with an in-car computer in the user's car. In this example, the reminder module 400 can receive data from the in-car computer indicating that the car needs an oil change, needs recharging, needs gasoline, or otherwise requires the user 102 to perform some task regarding the car. In yet another example, the computing device 104 can communicate over the network 106 with the user's refrigerator. In this example, the reminder module 400 can receive data from the refrigerator indicating that the user 102 is low on milk or other groceries and needs to buy more. In this example, the reminder module 400 can learn over time that it is contextually-appropriate to display task reminders corresponding to certain geographical locations (e.g., grocery stores) when the current geographical location of the computing device 104 is within a given distance of such geographical locations.

In various embodiments, the reminder module 400 can receive the task data in various ways. For example, the reminder module 400 can subscribe to one or more of the task sources 402 or external sources of task data. In this example, the task sources 402 or external task data sources autonomously provide data to subscribed components. In another example, the reminder module 400 can periodically poll one or more of the task sources 402 or external sources of task data. In this example, the task sources 402 or the external task data sources provide task data to the reminder module 400 in response to periodic requests from the reminder module 400.

If the reminder module 400 receives new or updated task data ("YES" of 502), the reminder module 400 uses the task data to generate, update, or delete one or more task reminders, such as the task reminders 206 (504). As suggested above, the reminder module 400 can generate reminders from various types of task data. For example, the reminder module 400 can generate reminders for each task entry in the task list 404. In this example, the reminder module 400 can delete a reminder if the user 102 marks a corresponding task entry in the task list 404 as completed. In another example, the reminder module 400 can generate task reminders for events in the calendar 408. In this example, the reminder module 400 can delete a reminder after the corresponding event in the calendar 408 is over. In yet another example, the reminder module 400 can generate reminders for each flagged document in the flagged documents list 407. In this example, the reminder module 400 can delete a reminder if the user 102 un-flags the document corresponding to the reminder.

In yet another example, the user 102 can generate a communication prompt to remind the user 102 call a person named "Joe" by dragging the name "Joe" in one of the task source elements 212 (FIG. 2) to the reminder area 204. In this example, the contact list 412 includes a set of contact information for Joe. In this example, the reminder module 400 can use the set of contact information for Joe to create a task reminder that includes Joe's phone number and address by importing Joe's phone number and address from the contact list 412.

In yet another example, the activity area 205 can include a list of contacts in the contact list 412. In this example, the user 102 can drag a given contact in the list of contacts to the reminder area 204. In response, the reminder module 400 can generate a new task reminder that reminds the user 102 to perform some task involving a person associated with the given contact.

In some embodiments, the reminder module 400 has an extensible architecture such that the functionality of the reminder module 400 can be extended to generate reminders from additional types of task data. For example, the reminder module 400 initially cannot generate reminders from data generated by an in-car computer. In this example, the reminder module 400 can accept a plug-in that enables the reminder module 400 to generate task reminders from data generated by the in-car computer.

If the reminder module 400 has not received new or updated task data ("NO" of 502), the reminder module 400 determines whether the reminder module 400 has received new or updated context data (506). As discussed briefly above, the reminder module 400 receives the context data from the context sources 414. From time to time, the context data provided by the context sources 414 changes in a relevant way. For example, the GPS module 416 can indicate that the computing device 104 has moved from one part of town to another part of town. In another example, the accelerometers 418 can indicate that the computing device 104 is accelerating in a manner consistent with the computing device 104 being transported in a car. In another example, the reminder module 400 can receive data from the calendar 408 indicating that the user 102 is scheduled to be in a meeting at a particular time.

Furthermore, in some embodiments, the reminder module 400 can receive context data from data sources that are outside the computing device 104. As explained above, the computing device 104 is able to communicate with one or more computing devices through the network 106. These other computing devices on the network 106 can provide context data to the reminder module 400. For example, one of the computing devices on the network 106 can host a service that provides meteorological data, such as whether it is going to rain in a particular location on a particular day. In this example, the ability of the user 102 to perform some tasks is dependent on the weather. For instance, mowing the lawn can be among the tasks that the user 102 needs to perform. However, if it is currently raining, it may be pointless to remind the user 102 to mow the lawn. Conversely, if it is going to rain tomorrow, it may be helpful to remind the user 102 to mow the lawn today.

If the reminder module 400 has not received new or updated context data ("NO" of 506), the reminder module 400 restarts the operation 500. In some embodiments, the reminder module 400 can sleep until the reminder module 400 receives new or updated task or context data.

Figure 6:
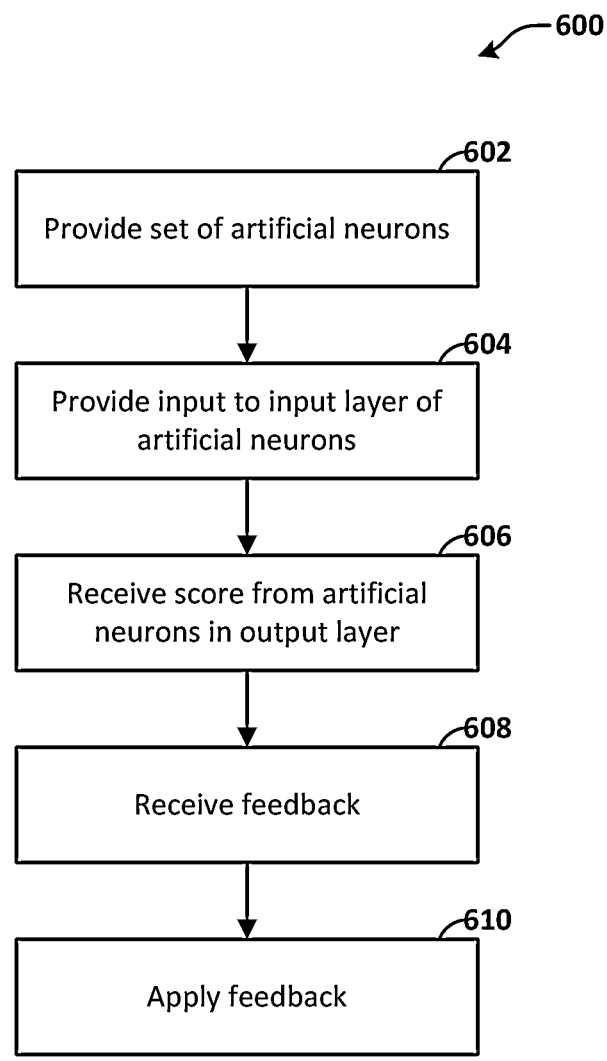
FIG. 6 is a flowchart illustrating an example artificial neural network algorithm for calculating scores for task reminders.

On the other hand, if the reminder module 400 has received new or updated context data ("YES" of 506) or after the reminder module 400 generates, updates, or deletes a reminder (504), the reminder module 400 uses a machine learning algorithm to calculate scores for the reminders (508). The scores are numerical values indicative of the likelihoods that the user 102 would find it helpful to be reminded of the tasks corresponding to the reminders given a current context. In various embodiments, the reminder module 400 uses various machine learning algorithms to calculate the scores for the reminders. FIG. 6, described in detail below, provides one example artificial neural network algorithm for calculating the scores for the reminders. In other embodiments, the reminder module 400 can use an inductive logic programming algorithm, a cluster analysis algorithm, a Bayesian network algorithm, a reinforcement learning algorithm, or another type of machine learning algorithm when identifying the most helpful task reminders in the current context.

After calculating the scores for the reminders, the reminder module 400 re-ranks the reminders based on their scores (510). For instance, the reminder module 400 can compare the scores of the reminders to determine that one reminder has a highest score, another reminder as a next highest score, and so on.

After re-ranking the reminders, the reminder module 400 determines whether the set of top-ranked reminders has changed (512). The set of top-ranked reminders includes a predetermined number of reminders. For instance, in the example of FIG. 2, the set of top-ranked reminders can include a maximum of four reminders because there is only enough room in the reminder area 204 for four reminders. Thus, the reminder area 204 only displays the reminders having the top four ranks and does not display the reminders having lower ranks. In some embodiments, the user 102 can configure the number of reminders in the set of top-ranked reminders. The set of top-ranked reminders can change when a new reminder enters the set of top-ranked reminders. Furthermore, in some instances, the set of top-ranked reminders can change when the ranks of reminders in the top-ranked reminders change.

If the set of top-ranked reminders has not changed ("NO" of 512), the operation 500 restarts. Otherwise, if the set of top-ranked reminders has changed ("YES" of 512), the reminder module 400 updates the reminder area 204 in the GUI 202 to display the set of top-ranked reminders (514). In this way, the user 102 can see the set of top-ranked reminders in the reminder area 204. Because the top-ranked reminders have the highest scores and because the scores are associated with likelihoods that the user 102 would find it helpful to be reminded of the corresponding tasks, the user 102 can see in the reminder area 204 reminders of the tasks that the user 102 would most likely find it helpful to be reminded. In other words, the user 102 can see in the reminder area 204 the most contextually-appropriate reminders.

In addition to updating the reminder area 204, the reminder module 400 can perform a notification action when the set of top-ranked reminders changes (516). For example, the reminder module 400 can cause a vibrator unit in the computing device 104 to vibrate. In another example, the reminder module 400 can cause a speaker unit in the computing device 104 to output a sound. In this way, the computing device 104 notifies the user 102 that the set of top-ranked reminders has changed. In some embodiments, the user 102 can limit the frequency at which the reminder module 400 can perform the notification action or disable the notification action. Moreover, in some embodiments, the user 102 can select notification actions for the reminder module 400 to perform when certain types of reminders enter the set of top-ranked reminders.

Furthermore, in some embodiments, the reminder module 400 can learn over time how to identify the most appropriate notification actions for various contexts. Consequently, the reminder module 400 can determine that a given notification action is more likely than a plurality of other available notification actions to be a most appropriate notification action given the current context of the user 102. For example, the reminder module 400 can learn that vibrating is the most appropriate notification action when the calendar 408 indicates that the user 102 is currently in a meeting. In another example, the reminder module 400 can learn that playing a message through the user's car stereo can be the most appropriate notification action when the accelerometers 418 indicate that the user 102 is driving. In yet another example, the reminder module 400 can learn that the user 102 does not want the reminder module 400 to perform a notification action when task reminders corresponding to particular types of tasks enter the set of top-ranked reminders. The reminder module 400 can use an artificial neural network algorithm or another machine learning algorithm to identify the most appropriate notification actions for various contexts.

After the reminder module 400 performs the notification action, the operation 500 repeats. By repeating the operation 500 multiple times over the course of a day, the reminder module 400 can provide contextually-appropriate task reminders to the user 102 as the current context of the user 102 changes over the course of the day.

FIG. 6 is a flowchart illustrating an example artificial neural network (ANN) algorithm 600 for calculating scores for reminders. In the example of FIG. 6, the reminder module 400 performs the ANN algorithm 600 for each reminder.

As illustrated in the example of FIG. 6, the reminder module 400 first provides a set of artificial neurons in an artificial neuron network (602). The set of artificial neurons includes an input layer, one or more intermediate layers, and an output layer. Artificial neurons in the each layer, aside from the output layer, provide their outputs to the next layer of artificial neurons. For instance, artificial neurons in the input layer provide their outputs to artificial neurons in a first intermediate layer. Artificial neurons in each layer, aside from the input layer, receive their inputs from a previous layer of artificial neurons. Each artificial neuron performs a function on its inputs to generate an output. The function involves one or more weight values. The function can produce different output values from the same set of input values if the weight values of the function are different.

To generate the score for a given task reminder, the reminder module 400 provides input to the input layer artificial neurons (604). The input can include a wide variety of different types of data. For example, the input can include context data received from the context sources 414, context data received from sources outside the computing device 104, data about other tasks of the user 102, data regarding the task corresponding to the given task reminder, and other types of data. The data regarding the task corresponding to the given task reminder can include a due date for the corresponding task, a priority level of the corresponding task, a location associated with the corresponding task, a source of the given task reminder, a task type of the corresponding task, start and end times of the corresponding task, a description of the corresponding task, people associated with the corresponding task, and other types of data regarding the corresponding task.

Providing the input to the input layer artificial neurons starts the process in which the input layer artificial neurons apply weighted functions to generate outputs that are provided as inputs to the next layer of artificial neurons. This process continues until the reminder module 400 receives a score for the given reminder from one or more artificial neurons in the output layer (606).

After receiving the score, the reminder module 400 receives feedback from the user 102 (608). The feedback can indicate whether the score assigned to the given reminder was too high or too low. In various embodiments, the reminder module 400 can receive feedback from the user 102 in various ways. For example, the reminder module 400 can receive input from the user 102 to reorder the reminders in the expanded reminder area 300. In the example of FIG. 3, if the user 102 thinks that the reminder 302C is ranked too high or too low, the user 102 can drag the reminder 302C down or up such that the reminder 302C is at an appropriate place relative to the other ones of the expanded reminders 302. For instance, if the user 102 thinks the reminder 302C is ranked too highly, the user 102 can drag the reminder 302C down to a position between the reminders 302F and 302G.

After receiving the feedback, the reminder module 400 applies the feedback to the artificial neurons (610). Applying the feedback to the artificial neurons can result in changes to the weights used in the functions of one or more of the artificial neurons. In various embodiments, the reminder module 400 uses various algorithms to apply the feedback to the artificial neurons. For example, the reminder module 400 can use evolutionary methods, simulated annealing, expectation-maximization algorithms, non-parametric methods, particle swarm optimization, and other algorithms for training artificial neural networks.

By providing sufficient feedback over time, the user 102 can train the artificial neural network to determine which reminders are appropriate in particular contexts. For example, the artificial neural network can be trained to assign relatively greater scores to reminders for tasks that involve the user 102 calling another person when the other person has an online status of "available" than when the other person has an online status of "busy." In another example, the artificial neural network can be trained to assign relatively lower scores to reminders for tasks that involve the user 102 calling another person when the user 102 is scheduled to be in a meeting at the current time. In yet another example, the artificial neural network can be trained to assign relatively lower scores to certain tasks based on information posted on social networking sites. In yet another example, the artificial neural network can be trained to assign relatively lower scores to tasks that the user 102 routinely completes without requiring task reminders.

Figure 7:
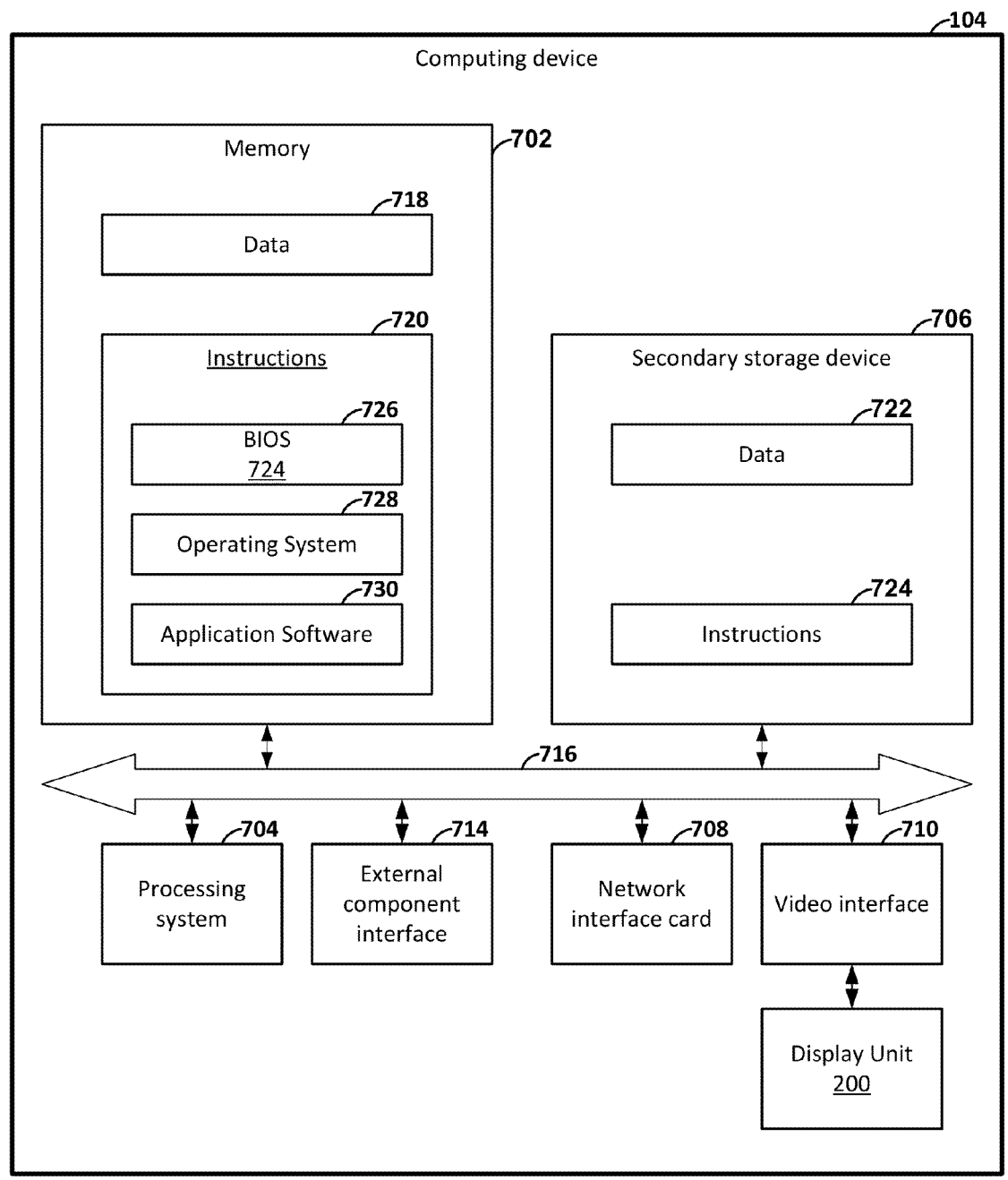
FIG. 7 is a block diagram illustrating example physical components of the computing device.

FIG. 7 is a block diagram illustrating example physical components of the computing device 104. It should be appreciated that in other embodiments, the computing device 104 is implemented using computing devices having hardware components other than those illustrated in the example of FIG. 7.

As used herein, the term computer readable media may include computer storage media and communication media. As used in this document, a computer storage medium is a device or article of manufacture that stores data and/or computer-executable instructions. A computer storage medium does not consist of transitory signals. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

Communication media may include any information delivery media that carries computer-executable instructions, data structures, program modules, or other data in a modulated data signal. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 7, the computing device 104 comprises a memory 702, a processing system 704, a secondary storage device 706, a network interface card 708, a video interface 710, the display unit 200, an external component interface 714, and a communication medium 716. The memory 702 includes one or more computer storage media capable of storing data 718 and/or computer-executable instructions 720.

The secondary storage device 706 includes one or more computer storage media. The secondary storage device 706 stores data 722 and computer-executable instructions 724 not directly accessible by the processing system 704. In other words, the processing system 704 performs an I/O operation to retrieve data and/or software instructions from the secondary storage device 706.

The processing system 704 includes one or more processing units. A processing unit is a physical device or article of manufacture comprising one or more integrated circuits that read data and instructions from computer readable media, such as the memory 702 and the secondary storage device 706, and selectively execute the instructions. In various embodiments, the processing system 704 is implemented in various ways. For example, the processing system 704 can be implemented as one or more processing cores. In another example, the processing system 704 can comprise one or more separate microprocessors. In yet another example embodiment, the processing system 704 can comprise an application-specific integrated circuit (ASIC) that provides specific functionality. In yet another example, the processing system 704 provides specific functionality by using an ASIC and by executing computer-executable instructions.

The network interface card 708 is a device or article of manufacture that enables the computing device 104 to send data to and receive data from a communication network. In different embodiments, the network interface card 708 is implemented in different ways. For example, the network interface card 708 can be implemented as an Ethernet interface, a token-ring network interface, a fiber optic network interface, a wireless network interface (e.g., Wi-Fi, WiMax, etc.), or another type of network interface.

The video interface 710 enables the computing device 104 to output video information to the display unit 200. The display unit 200 can be various types of devices for displaying video information, such as a cathode-ray tube display, an LCD display panel, a plasma screen display panel, a touch-sensitive display panel, an LED screen, or a projector. The video interface 710 can communicate with the display unit 200 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 714 enables the computing device 104 to communicate with external devices. For example, the external component interface 714 can be a USB interface, a FireWire interface, a serial port interface, a parallel port interface, a PS/2 interface, and/or another type of interface that enables the computing device 104 to communicate with external devices. In various embodiments, the external component interface 714 enables the computing device 104 to communicate with various external components, such as external storage devices, input devices, speakers, modems, media player docks, other computing devices, scanners, digital cameras, and fingerprint readers.

The communications medium 716 facilitates communication among the hardware components of the computing device 104. In the example of FIG. 7, the communications medium 716 facilitates communication among the memory 702, the processing system 704, the secondary storage device 706, the network interface card 708, the video interface 710, and the external component interface 714. The communications medium 716 can be implemented in various ways. For example, the communications medium 716 can comprise a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the instructions 720 in the memory 702 can include Basic Input/Output System (BIOS) instructions 726 and operating system instructions 728. Execution of the BIOS instructions 726 by the processing system 704 causes the computing device 104 to boot up. Execution of the operating system instructions 728 causes the computing device 104 to provide an operating system that coordinates the activities and sharing of resources of the computing device 104. Furthermore, the memory 702 stores application software 730. Execution of the application software 730 by the processing system 704 configures the computing device 104 to provide one or more applications. The memory 702 also stores data 718 used by programs that execute on the computing device 104.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders or be executed concurrently. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing contextually-appropriate task reminders, the method comprising:
   receiving a selection of a task source element;
   generating a task reminder based on the task source element;
   learning, by a computing device, over time how to identify contextually-appropriate task reminders in different contexts;
   displaying a graphical user interface on a display unit, the graphical user interface containing a reminder area and an activity area;
   as the task source element changes, updating the reminder area to generate, update or delete task reminders such that the task reminders are contextually-appropriate; and
   as a current context changes, updating the reminder area such that the reminder area contains the task reminders that are contextually-appropriate in the current context.

2. The method of claim 1, further comprising:
   receiving context data that provides information about the current context; and
   using the context data to generate data representative of a likelihood that the task reminder helpful in the current context; and
   wherein displaying the graphical user interface comprises displaying the task reminder in the reminder area after determining that the likelihood is sufficiently great.

3. The method of claim 2, further comprising:
   calculating scores for a plurality of task reminders based at least in part of the context data, the task reminder being among the plurality of task reminders, the score for each task reminder being the data representative of the likelihood that the task reminder helpful;
   ranking the plurality of task reminders based on the scores for the task reminders; and
   wherein displaying the graphical user interface comprises:
   displaying ones of the task reminders having highest ranks either without displaying ones of the task reminders having lower ranks or displaying the task reminders having lower ranks less prominently than the task reminders having the highest ranks.

4. The method of claim 3, wherein calculating the scores for the plurality of task reminders comprises:
   providing the context data to input layer artificial neurons in an artificial neural network; and
   receiving a score for the task reminder from one or more output layer artificial neurons in the artificial neural network, the task reminder being among the plurality of task reminders.

5. The method of claim 2, wherein learning over time how to identify the contextually-appropriate task reminders comprises:
   receiving feedback from a user; and
   modifying how the computing device identifies the contextually-appropriate task reminders in response to the feedback.

6. The method of claim 5, wherein receiving the feedback comprises receiving input from the user to reorder the task reminders in the reminder area.

7. The method of claim 2, wherein receiving the context data comprises receiving at least some of the context data from another computing device.

8. The method of claim 7, wherein receiving the context data comprises receiving at least some of the context data from a source within the computing device.

9. The method of claim 1, further comprising generating a plurality of task reminders, the contextually-appropriate task reminders being among the plurality of task reminders, each task reminder in the plurality of task reminders corresponding to a task to be performed by a user.

10. The method of claim 9, wherein generating the plurality of task reminders comprises generating the plurality of task reminders based on task items in a task list of the user.

11. The method of claim 9, further comprising:
    displaying a document in the graphical user interface;
    receiving input from the user to flag the document; and
    wherein generating the plurality of task reminders comprises generating the task reminder in response to receiving an input from the user to flag the document.

12. The method of claim 1, further comprising:
    displaying a document in the graphical user interface;
    identifying a set of task source elements within the document; and
    wherein receiving a selection of the task source element comprises receiving input of the task source element by being dragged to the reminder area, the task source element being in the set of task source elements.

13. The method of claim 1, further comprising:
    determining that the task reminder that was determined not to be contextually-appropriate in one context to be appropriate in the current context; and
    performing a notification action in response to determining that the task reminder is now contextually appropriate.

14. The method of claim 13, further comprising:
    learning, by the computing device, over time how to select appropriate notification actions the different contexts; and
    determining that the notification action is more likely than a plurality of other available notification actions to be a most appropriate notification action the current context.

15. A computing device comprising:
    one or more computer storage media that store instructions; and
    one or more processing units that access and execute the instructions, execution of the instructions by the one or more processing units configuring the computing device such that the computing device:
    receives a selection of a task source element;
    generates a task reminder based on the task source element;
    learns over time how to identify contextually-appropriate task reminders for different contexts; and
    causes a display unit to display a graphical user interface, the graphical user interface containing a reminder area and an activity area, the reminder area being updated as the task source element changes to generate, update or delete task reminders such that the task reminders are contextually-appropriate and the reminder area being updated as a current context changes such that the reminder area contains the task reminders that are contextually-appropriate in the current context.

16. The computing device of claim 15, wherein execution of the instructions by the one or more processing units configures the computing device such that the computing device:

receives context data that provides information about a current geographical location of the computing device; and learns over time that it is contextually-appropriate to display the task reminders corresponding to tasks involving a given geographical location when the current geographical location of the computing device is within a given distance of the given geographical location.

17. The computing device of claim 15, wherein execution of the instructions by the one or more processing units configures the computing device such that the computing device:

generates a plurality of task reminders, each of the task reminders corresponding to a task to be performed by the user; and scrolls the reminder area in response to input from the user, wherein prior to scrolling the reminder area, the reminder area contains ones of the task reminders that the computing device determines to be most likely to be helpful to the user given the current context, wherein after scrolling the reminder area, the reminder area contains ones of the task reminders that the computing device determines to be less likely to be helpful to the user given the current context.

18. A computer storage media that store instructions, wherein execution of the instructions by one or more processing units cause a computing device to perform the steps of:

learning over time how to identify contextually-appropriate task reminders for different contexts;

causing a display unit to display a graphical user interface, the graphical user interface containing a reminder area that is updated as a current context changes such that the reminder area contains task reminders that are contextually-appropriate in the current context;

receiving input from the user to drag a contact to the reminder area, the contact comprising contact information for another user;

generating a task reminder; and determining, after receiving context data, that the task reminder is among the contextually-appropriate task reminders for the current context.

19. The computer storage media of claim 18, wherein execution of the instructions by the one or more processing units further causes the computing device to perform the steps of:

receiving context data that provides information about a current geographical location of the computing device; and learning over time that it is contextually-appropriate to display the task reminders corresponding to tasks involving a given geographical location when the current geographical location of the computing device is within a given distance of the given geographical location.

20. The computer storage media of claim 18, wherein execution of the instructions by the one or more processing units further causes the computing device to perform the steps of:

generating a plurality of task reminders, each of the task reminders corresponding to a task to be performed by the user; and scrolling the reminder area in response to input from the user, wherein prior to scrolling the reminder area, the reminder area contains ones of the task reminders that the computing device determines to be most likely to be helpful to the user given the current context, wherein after scrolling the reminder area, the reminder area contains ones of the task reminders that the computing device determines to be less likely to be helpful to the user given the current context.

* * * * *